US010266076B2

(12) United States Patent
Schanderl et al.

(10) Patent No.: US 10,266,076 B2
(45) Date of Patent: Apr. 23, 2019

(54) DEVICE FOR ADJUSTING THE INCLINATION OF A BACKREST

(71) Applicant: GRAMMER AG, Amberg (DE)

(72) Inventors: Florian Schanderl, Schwarzenfeld (DE); Thomas Haller, Ursensollen (DE)

(73) Assignee: GRAMMER AG, Amberg (DE)

( * ) Notice: Subject to any disclaimer, the term of this patent is extended or adjusted under 35 U.S.C. 154(b) by 120 days.

(21) Appl. No.: 15/667,057

(22) Filed: Aug. 2, 2017

(65) Prior Publication Data

US 2018/0050612 A1    Feb. 22, 2018

(30) Foreign Application Priority Data

Aug. 17, 2016  (DE) .................. 10 2016 115 267

(51) Int. Cl.
*B60N 2/22* (2006.01)
*B60N 2/20* (2006.01)
*B60N 2/235* (2006.01)

(52) U.S. Cl.
CPC .............. *B60N 2/22* (2013.01); *B60N 2/20* (2013.01); *B60N 2/2356* (2013.01)

(58) Field of Classification Search
None
See application file for complete search history.

(56) References Cited

U.S. PATENT DOCUMENTS 4,355,846 A * 10/1982 Kluting ................ B60N 2/2352
16/292
4,456,300 A * 6/1984 Kluting ................ B60N 2/2352
16/292

(Continued)

FOREIGN PATENT DOCUMENTS

DE    10 2008 025 198 A1    12/2009
DE    102012010421    8/2013

(Continued)

OTHER PUBLICATIONS

Extended Search Report for European Patent Application No. 17180737.3, dated Jan. 25, 2018, pages.

(Continued)

*Primary Examiner* — David E Allred
(74) *Attorney, Agent, or Firm* — Sheridan Ross P.C.

(57) ABSTRACT

Device for a vehicle seat for adjusting the inclination of a backrest, which extends in a backrest longitudinal direction, relative to a seat part, an inclination-adjusting apparatus, which can rotate about a first axis of rotation extending in the vehicle seat width direction, of the device for adjusting the backrest inclination being connected to the seat part, and a coil spring of the device being connected to the inclination-adjusting apparatus at one end and to the seat part at the other end, the device comprising the inclination-adjusting apparatus, an adapter element, which can rotate about the first axis of rotation, is rigidly connected to the inclination-adjusting apparatus and comprises a first stop element, a coil spring that can rotate about the first axis of rotation and comprises both a first coil spring end, which is arranged so as not to move relative to the adapter element, and a second coil spring end, and a second stop element, which is connected to the seat part in such a way that it does not move, and the second coil spring end being in operative contact with the first stop element when a first angle between the backrest longitudinal direction and a vehicle seat longitudinal direction is smaller than a limit angle, and being in operative contact with the second stop element when a first angle is greater than the limit angle.

11 Claims, 6 Drawing Sheets

(56) References Cited

U.S. PATENT DOCUMENTS

| | | | | |
|---|---|---|---|---|
| 2003/0056329 A1* | 3/2003 | Coman | | B60N 2/206 16/343 |
| 2003/0197410 A1* | 10/2003 | Blair | | B60N 2/0705 297/378.12 |
| 2004/0195890 A1* | 10/2004 | Liu | | B60N 2/236 297/367 R |
| 2010/0187886 A1* | 7/2010 | Yamada | | B60N 2/22 297/354.12 |
| 2010/0244530 A1* | 9/2010 | Kitano | | B60N 2/20 297/362 |
| 2012/0248841 A1* | 10/2012 | Hellrung | | B60N 2/20 297/354.1 |
| 2013/0234488 A1* | 9/2013 | Pleskot | | B60N 2/22 297/354.12 |
| 2013/0270884 A1* | 10/2013 | Espinosa | | B60N 2/20 297/378.12 |
| 2014/0110984 A1* | 4/2014 | Assmann | | B60N 2/20 297/354.1 |
| 2014/0284983 A1* | 9/2014 | Yamada | | B60N 2/235 297/362 |
| 2014/0284984 A1* | 9/2014 | Yamada | | B60N 2/2358 297/366 |
| 2014/0375106 A1* | 12/2014 | Yamada | | B60N 2/682 297/452.18 |
| 2015/0202995 A1 | 7/2015 | Makita et al. | | |
| 2015/0306985 A1* | 10/2015 | Kimura | | B60N 2/12 297/354.12 |
| 2017/0246968 A1* | 8/2017 | Adamik | | B60N 2/36 |
| 2018/0236906 A1* | 8/2018 | Pluta | | B60N 2/20 |
| 2018/0354393 A1* | 12/2018 | Mizobata | | B60N 2/2352 |

FOREIGN PATENT DOCUMENTS

| | | |
|---|---|---|
| EP | 1747936 | 1/2007 |
| WO | WO 2003/022 622 A1 | 3/2003 |
| WO | WO 2005/068249 | 7/2005 |

OTHER PUBLICATIONS

Search Report prepared by the German Patent Office dated May 10, 2017, for German Patent Application No. 10 2016 115 267.6.

* cited by examiner

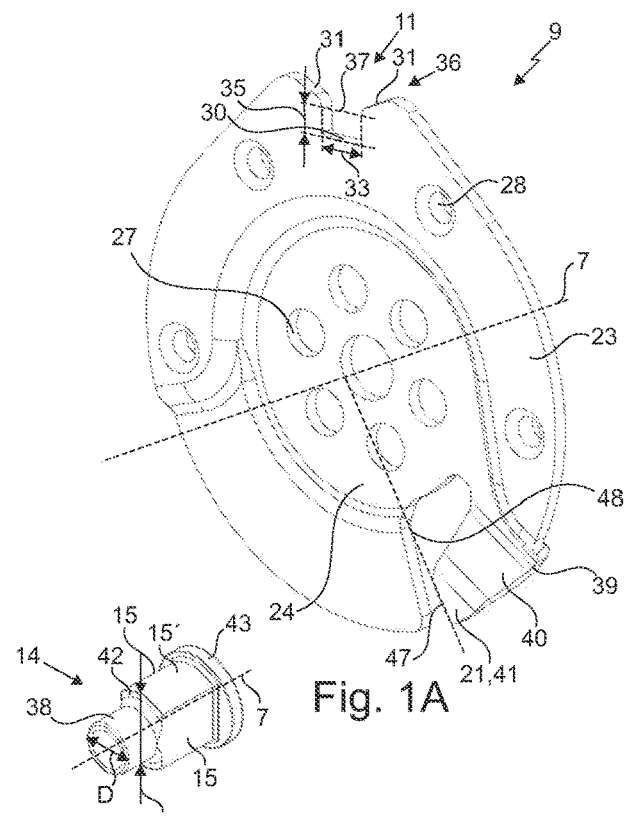
Fig. 1A
Fig. 1B
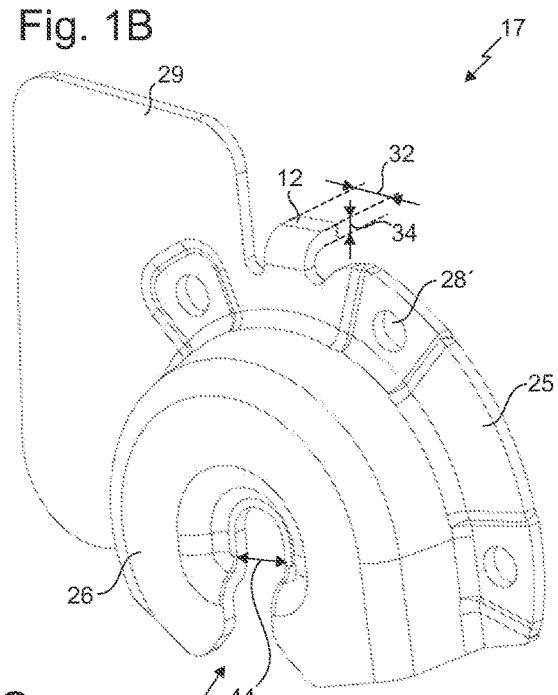
Fig. 1C

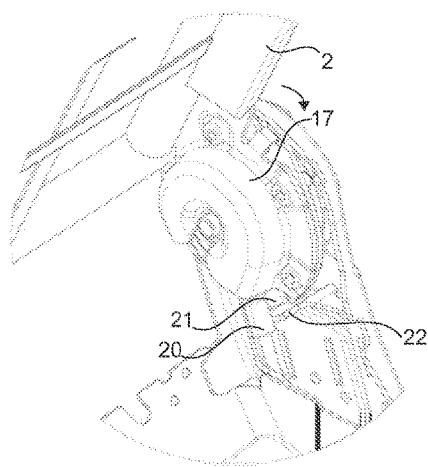
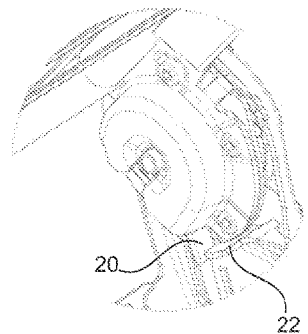
Fig. 5D　　　　Fig. 5E
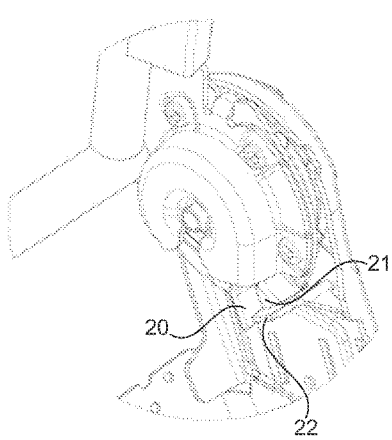
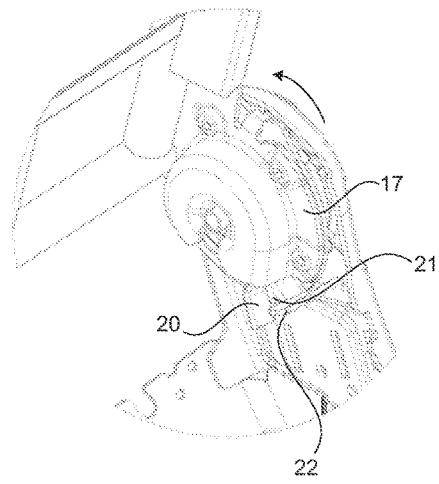
Fig. 5G　　　　Fig. 5F

DEVICE FOR ADJUSTING THE INCLINATION OF A BACKREST

CROSS-REFERENCE TO RELATED APPLICATIONS

This application claims the benefit of German Patent Application No. DE 10 2016 115 267.6 filed Aug. 17, 2016, the entire contents of which are incorporated herein by reference.

FIELD

The invention relates to a device for a vehicle seat for adjusting the inclination of a backrest, which extends in a backrest longitudinal direction, relative to a seat part, an inclination-adjusting apparatus, which can rotate about a first axis of rotation extending in the vehicle seat width direction, of the device for adjusting the backrest inclination being connected to the seat part, and a coil spring of the device being connected to the inclination-adjusting apparatus at one end and to the seat part at the other end.

BACKGROUND

Vehicle seats of this type are known in the art. In the present case, the inclination-adjusting apparatus is connected to the seat part on one side and to the backrest on the other side. By actuating the inclination-adjusting apparatus, the inclination of the backrest with respect to the seat part can be changed so that the vehicle seat can be adapted in line with the comfort perceptions of a person.

When adjusting the inclination of the backrest relative to the seat part, the spiral spring is correspondingly rotated in accordance with the rotation of the inclination-adjusting apparatus about the first axis of rotation, in such a way that a force has to be applied in order to pivot the backrest about the first axis of rotation. This rotation can either be a clockwise or a counter-clockwise rotation of the inclination-adjusting apparatus.

SUMMARY

The object of the present invention is therefore to provide a device that can be used to simplify the adjustment of the inclination of the backrest.

This object is achieved by the features of claim 1. Advantageous embodiments of the invention can be found in the dependent claims.

The main concept of the invention is to provide a device for a vehicle seat for adjusting the inclination of a backrest, which extends in a backrest longitudinal direction, relative to a seat part, an inclination-adjusting apparatus, which can rotate about a first axis of rotation that extends in the vehicle seat width direction, of the device for adjusting the backrest inclination being connected to the seat part, and a coil spring of the device being connected to the inclination-adjusting apparatus at one end and to the seat part at the other end, the device comprising the inclination-adjusting apparatus, an adapter element, which can rotate about the first axis of rotation, is rigidly connected to the inclination-adjusting apparatus and comprises a first stop element, a coil spring that can rotate about the first axis of rotation and comprises both a first coil spring end that does not move with respect to the adapter element and a second coil spring end, and a second stop element, which is connected to the seat part in such a way that it cannot move, and the second coil spring end being in operative contact with the first stop element when a first angle between the backrest longitudinal direction and a vehicle seat longitudinal direction is smaller than a limit angle, and said coil spring being in operative contact with the second stop element when a first angle is greater than the limit angle.

The adapter element is particularly preferably welded, screwed, riveted or connected in a similar manner to the inclination-adjusting apparatus, a welded connection being preferred. By actuating the inclination-adjusting apparatus, i.e. rotating the inclination-adjusting apparatus about the first axis of rotation, the adapter element is also rotated about the first axis of rotation due to the rigid connection between the adapter element and the inclination-adjusting apparatus.

It is particularly preferable for a plurality of devices to be provided, for example one device on the left-hand side of the seat part and one device on the right-hand side of the seat part. Alternatively, it is also conceivable for a device according to the invention to be arranged on one side of the seat part and for another inclination-adjusting apparatus to be arranged on the other side of the seat part, the inclination-adjusting apparatuses being synchronised by means of a coupling rod in such a way that the additional inclination-adjusting apparatus is accordingly actuated when the inclination-adjusting apparatus is actuated.

According to the device of the invention, when the inclination-adjusting apparatus is rotated about the first axis of rotation, the coil spring is accordingly rotated about the first axis of rotation on account of the rigid connection between the inclination-adjusting apparatus and the adapter element and on account of the coil spring being arranged so as to be immovable relative to the adapter element.

Since the adapter plate comprises the first stop element, said element is correspondingly rotated in accordance with the rotation of the adapter plate about the first axis of rotation.

If the backrest is rotated relative to the seat part about the first axis of rotation, the angle between the backrest longitudinal direction and the vehicle seat longitudinal direction is changed. If the angle is smaller than the limit angle in this case, the backrest was accordingly pivoted forwards in the vehicle seat longitudinal direction. In this case, according to the invention the second coil spring end is now in operative contact with the first stop element. This means that, since the first stop element of the adapter plate and the coil spring, in particular the first coil spring end, are rotated about the first axis of rotation, no additional force acts on the coil spring. As a result, the tension of the coil spring is no longer changed, and so the backrest can be inclined forwards in the vehicle seat longitudinal direction without an additional application of force from the outside.

Alternatively, if the angle is greater than the limit angle, the backrest was pivoted backwards in the vehicle seat longitudinal direction proceeding from the inclination of the backrest at the limit angle. In this case, the second coil spring end is in operative contact with the second stop element, which is arranged on the seat part in such a way that it does not move. When the inclination-adjusting apparatus is rotated, resulting in a rotation of the coil spring and in particular of the first coil spring end, the second coil spring end is therefore always in operative contact with the second stop element. The second stop element can therefore also be considered to be immovable with respect to the seat part. Since, however, the first coil spring end rotates about the first axis of rotation, and the second coil spring end does not move relative to the seat part here, the tension of the coil spring is modified in such a way that a force has to be applied in order to rotate the backrest about the first axis of rotation. The further backwards the backrest is pivoted in the vehicle seat longitudinal direction, the greater the amount of force that correspondingly needs to be applied.

If, however, the angle corresponds to the limit angle, both the first and the second stop element are in operative contact with the second coil spring end. This denotes that the second coil spring end is now in operative contact with the second stop element and not with the first stop element, or vice versa.

According to a preferred embodiment, the angle is selected from a range of from 70° to 90°. The angle is particularly preferably 80°.

The limit angle can particularly advantageously be defined by the first and the second stop element in this case.

According to a particularly preferred embodiment, the first stop element comprises an end region, which is in operative contact with the second coil spring end, preferably by a first stop region, depending on the inclination of the backrest. More preferably, the stop region extends on the one hand in a first direction that is perpendicular to the first axis of rotation and on the other hand in an axial direction of the axis of rotation.

According to another preferred embodiment, the second stop element comprises a second stop region, which extends on the one hand in a second direction that is perpendicular to the first axis of rotation and on the other hand in the axial direction of the axis of rotation.

In this case, the limit angle is defined by the "angle between the backrest longitudinal direction and the vehicle seat longitudinal direction" and the "third angle between the first direction of the first stop element and the second direction of the second stop element". It is therefore possible to define various limit angles depending on the first and second direction.

According to a particularly preferred embodiment, the coil spring is pretensioned to a predetermined extent, the pretension being constant when the second coil spring end is in operative contact with the first stop element and being variable as the coil spring rotates when the second coil spring end is in operative contact with the second stop element.

The pretension is not modified when the second coil spring end is in operative contact with the first stop element, since, when the coil spring, in particular the first coil spring end, rotates, the first stop element that is in operative contact with the second coil spring end also rotates. The tension of the coil spring therefore does not change, since in this case both the first and the second coil spring end do not move with respect to the adapter element.

This is not the case when the second coil spring end is in operative contact with the second stop element. Analogously to the second stop element, the second coil spring end can be regarded as being immovable with respect to the seat part in this case, whereas the first coil spring end is rotated about the first axis of rotation, thus modifying the overall tension of the coil spring.

According to another embodiment, the device comprises a bolt element, which can rotate about the first axis of rotation and is rigidly connected to the adapter element, the first coil spring end being connected to the adapter element by the bolt element.

The bolt element is rigidly connected to the adapter element and also rotates about the first axis of rotation when the adapter element is rotated as a result of the actuation of the inclination-adjusting apparatus.

According to a particularly preferred embodiment, the bolt element comprises at least one planar region, which forms a second angle together with the backrest longitudinal direction when viewed in the vehicle seat width direction.

If the bolt element comprises at least one planar region in this case, and if the first coil spring end is complementary to said region, the coil spring is arranged so as not to move relative to the bolt element and, accordingly, relative to the adapter element or the inclination-adjusting apparatus.

The more precise design and functionality of the first and second stop element comprising the coil spring is outlined in more detail in the following.

If the backrest rotates about the first axis of rotation, the angle between the backrest longitudinal direction and the vehicle seat longitudinal direction constantly changes. This can therefore cause the first and second stop elements to be arranged on a common radial segment, viewed in a direction extending perpendicularly away from the first axis of rotation. The coil spring can be pretensioned in this case.

In this case whereby the first and the second stop element correspond to one another when viewed in a direction that is perpendicular to the first axis of rotation, the coil spring, in particular the second coil spring end, is in operative contact with both the first and the second stop element. If the backrest is now rotated further forwards in the vehicle seat longitudinal direction, the first stop element is accordingly also rotated, as is the second coil spring end. As a result, the second coil spring end remains in contact with the first stop element, and the contact between the second coil spring end and the second stop element is simultaneously released.

Since the first coil spring end is arranged so as not to move relative to the adapter element, preferably as a result of the bolt element, and also since the first stop element is arranged on the adapter element in such a way that it does not move, the pretension of the coil spring is not modified, so that the backrest can be folded forwards without any force having to be applied.

However, if the backrest is moved backwards in the vehicle seat longitudinal direction, the situation changes. The second coil spring end remains in operative contact with the second stop element, and the first stop element is moved away from the second coil spring end. If the adapter element together with the coil spring is moved further backwards about the first axis of rotation, the degree to which the coil spring is pretensioned is modified, since the first coil spring end is moved in accordance with the adapter element, and the second coil spring end remains in contact with the second stop element.

According to another embodiment, the inclination-adjusting apparatus, the adapter element and the coil spring are arranged one behind the other when viewed in the vehicle seat width direction from the seat part to the backrest.

According to another preferred embodiment, the first stop element comprises an initial region, a central region and an end region, the end region lying in a first plane that is perpendicular to the first axis of rotation.

According to a more preferred embodiment, the end region comprises the first stop region, which extends on the one hand in a first direction that is perpendicular to the second axis of rotation and on the other hand in the axial direction of the axis of rotation.

The second stop element preferably comprises a second stop region which extends on the one hand in a second direction that is perpendicular to the first axis of rotation and on the other hand in the axial direction of the axis of rotation.

According to a particularly preferred embodiment, the second coil spring end extends in a direction that is perpendicular to the first axis of rotation at one end and in the axial direction of the axis of rotation at the other end.

The third extension direction in each case, which corresponds to the height of the element in each case, can be considered to be small in comparison with the specified extension directions in this case.

A method for assembling a device, the coil spring being connected to the bolt element, the second coil spring end not being in operative contact with the first or the second stop element, and the second coil spring end being arranged in front of the first and the second stop element when viewed in the longitudinal direction, and the second stop element being arranged in front of the first stop element; said method comprising rotating the backrest forwards in the vehicle seat longitudinal direction, the second coil spring end being positively guided along the first stop element until the second coil spring end jumps over the second stop element, as a result of which the fundamental pretension of the coil spring is set; and rotating the backrest backwards in the vehicle seat longitudinal direction, the first stop element being moved forwards as a result of the backwards rotation of the backrest, and the second coil spring end moving on the second stop element in a positively guided manner and jumping over the first stop element.

The coil spring is first placed on the bolt element so that the first coil spring end is connected to the bolt element in such a way that it does not move. The second coil spring end is not in operative contact with the first or the second stop element in this case. In particular, the second coil spring end is arranged in front of the first and the second stop element when viewed in the longitudinal direction, the second stop element being arranged in front of the first stop element.

In this case, in the step of rotating the backrest forwards, the second coil spring end is positively guided along the first stop element until the second coil spring end jumps over the second stop element, in particular a second stop region. The fundamental pretension of the coil spring is set. However, the second coil spring end is now between the first and the second stop element, operative contact only being possible between the second coil spring end and the second stop element until now. In order to allow operative contact with the first stop element, the second coil spring end needs to be arranged behind both the first and the second stop element when viewed in the longitudinal direction.

This is established in the step of rotating the backrest backwards, in which the backrest is rotated backwards once again, viewed in the longitudinal direction. Since in the preceding step the second coil spring end is arranged between the first and the second stop element, the first stop element is moved forwards by rotating the backrest backwards. The second coil spring end is moved on the second stop element in a positively guided manner and also jumps over the first stop element.

Additional advantageous embodiments can be found in the dependent claims.

BRIEF DESCRIPTION OF THE DRAWINGS

Additional objects, advantages and expedient uses of the present invention can be found in the following description in conjunction with the drawings, in which:

FIG. 1A shows an adapter element of a device according to a preferred embodiment;

FIG. 1B shows a bolt element of a device according to a preferred embodiment;

FIG. 1C shows an adapter housing of a device according to a preferred embodiment;

FIG. 5A-5H show a schematic process for pretensioning the coil spring; and

In the drawings, identical components are to be provided with corresponding reference numerals in each case. For the sake of improved clarity, components that have been labelled elsewhere may not be provided with a reference sign in some of the drawings.

DETAILED DESCRIPTION

Figure 2:
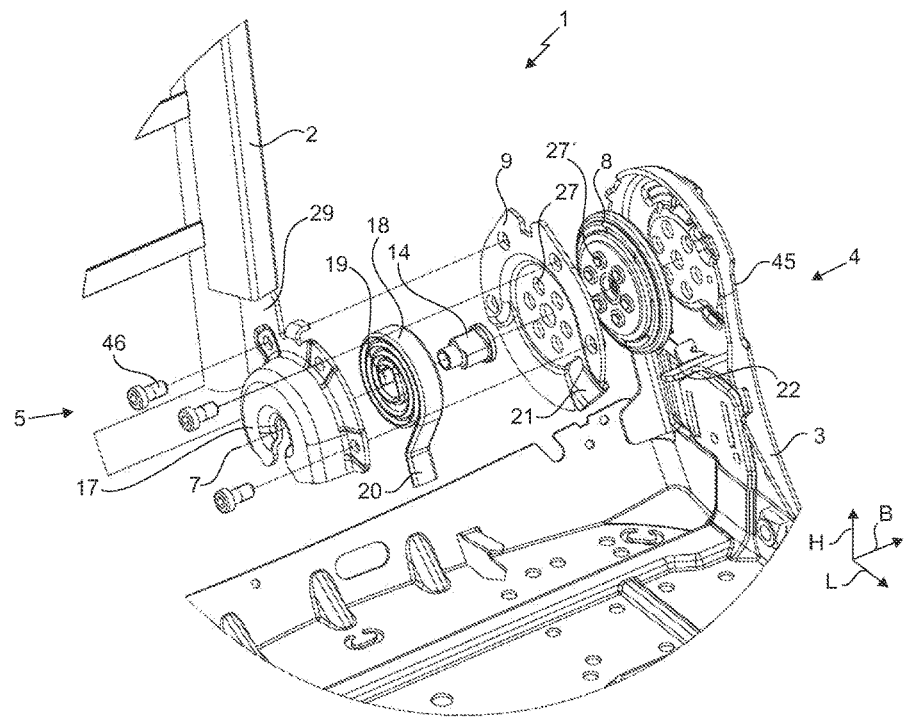
FIG. 2 is an exploded view of a device according to a preferred embodiment.

FIG. 1A-1C show various components of a device 1 according to a particularly preferred embodiment. FIG. 1A shows an adapter element 9, FIG. 1B shows a bolt element 14, and FIG. 1C shows an adapter housing 17. In addition to the embodiments according to the invention, additional functions and embodiments are described.

According to the invention, the adapter element 9 is rigidly connected to an inclination-adjusting apparatus 8 (not shown in this case). For this purpose, the adapter element 9 preferably comprises at least a first connection point 27, which can be connected, in particular welded, to first complementary connection points 27' (not shown in this case). The connection points 27, 27' are used in particular to position the adapter element 9 relative to the inclination-adjusting apparatus 8. The adapter element 9 is also arranged so as to be able to rotate about the first axis of rotation 7 on account of the rigid connection to the inclination-adjusting apparatus 8.

Furthermore, according to the invention the adapter element 9 comprises a first recess 11, which can be connected to a first tab 12. In this case, the first recess 11 preferably comprises a central region 30 and at least one side region 31, in the present case two side regions 31. The central region 30 is of such a size here that the width 31 of the tab 12 substantially corresponds to the width 33 of the central region 30. Furthermore, the height 35 of the recess 11 is greater than the height 34 of the tab 12.

The recess 11 is substantially funnel-shaped or formed in the shape of a funnel 36 in the present case, the central region 30 being substantially rectangular when the adapter element is viewed from above. In a plan view of the adapter element 9, the side regions 31 form the sides of a trapezium, the shorter base 37 of the trapezium forming a side of the rectangle of the central region 30.

Furthermore, it can be seen in FIG. 1A that the adapter element 9 comprises a first region 23 and a second region 24, the first region 23 extending in a first plane, and the second region 24 extending in a second plane, the first plane being parallel to the second plane.

Furthermore, the adapter element 9 comprises a first stop element 21, which is connected to the second region 24 of the adapter element 9 by an initial region 39 and comprises a central region 40 and an end region 41. In particular, the central region 40 extends, inter alia, in the direction of the first axis of rotation 7, away from the second region 24. The central region 40 merges into an end region 41, the end region 41 comprising a first stop region 47. The first stop region 47 extends in a first direction 48 that is perpendicular to the first axis of rotation 7 and in the axial direction of the first axis of rotation 7 in this case.

Furthermore, FIG. 1A shows that the first region 23 comprises at least a second connection point 28, which can be connected to the second connection points 28' of the first region 25 of the adapter housing 17 by means of a connection, for example by a screw connection or the like.

FIG. 1B shows a bolt element 14, which can be rigidly connected to the adapter element 9 by a connecting portion 43 so that the bolt element 14 can also rotate about the first axis of rotation 7. The connecting portion 43 is preferably welded to the adapter element 9. The bolt element 14 further comprises a portion that comprises at least one planar region 15 and one circular region 15' having a diameter D'. In the present case, two planar regions 15 of this type are provided. The bolt element 14 further comprises a cylindrical portion 38, which adjoins the portion comprising the planar regions 15. The cylindrical portion 38 has a diameter D that corresponds to the width 44 of a second recess 44.

The second recess 13 is similar to the first recess 11 in this case, thus also comprising a central region, which is, however, substantially circular in the present case, and a funnel.

On account of the funnel-shaped design, on the one hand the first recess 11 can be more easily connected to the first tab 12 and on the other hand the second recess 13 can be more easily connected to the bolt element 14.

Furthermore, the bolt element comprises a transition region 42 between the portion comprising planar regions 15 and the cylindrical region 38.

In particular, the diameter D of the cylindrical region 38 is no greater than a distance between the parallel planar regions 15 of the bolt element 14, of which there are two in the present case.

The adapter housing 17 further comprises an adapter plate 29, by means of which the adapter housing 17 can be connected to the backrest 2.

FIG. 2 shows a device 1 according to a preferred embodiment and a backrest 2 and a seat part 3. The seat part 3 in particular comprises a portion 45 in the rear region 4 thereof, which extends in the vertical direction H of the vehicle seat. An inclination-adjusting apparatus 8 is rigidly connected to the seat part 3, in the present case the portion 45.

The adapter housing 17 is connected to the backrest 2 by means of the adapter plate 29. Furthermore, the adapter element 9 is arranged on the inclination-adjusting apparatus 8, at least the first connection points 27 being rigidly connected to the first complementary connection points 27' so that the adapter element 9 is rigidly connected to the inclination-adjusting apparatus 8.

The bolt element 14 is rigidly connected to the adapter element 9, and a coil spring 18 is connected to the bolt element 14, which coil spring comprises a first coil spring end 19 and a second coil spring end 20. In this case, the first coil spring end 19 is formed in accordance with the portion of the bolt element 14 comprising planar regions 15 and is dimensioned in such a way that the first coil spring end 19 interlockingly surrounds the portion comprising planar regions 15.

Furthermore, the adapter housing 17 and the adapter element 9 are interconnected by screws 46. In particular, additional releasable connections are also conceivable so that the backrest 2 can be re-released from the seat part 3 both simply and quickly.

Figure 3:
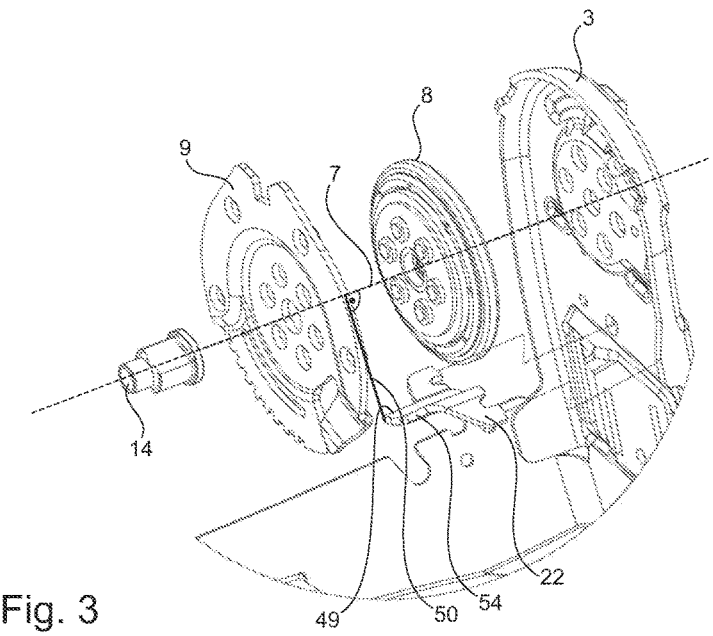
FIG. 3 shows the elements that are rigidly connected to the seat part.

In addition, the seat part 3 comprises another second stop element 22, which is shown, inter alia, in more detail in FIG. 3.

In particular, FIG. 3 shows the component parts of the device 1 that are rigidly connected to the seat part 3, in the present case the inclination-adjusting apparatus 8, the adapter element 9 and the bolt element 14, the bolt element 14 being rigidly connected to the adapter element 9, and the adapter element 9 being rigidly connected to the inclination-adjusting apparatus 8. The second stop element 22 which is also rigidly connected to the seat part 3 can also be seen. The rigid connection is preferably a welded connection.

As can also be seen, the second stop element 22 comprises an enlargement region 54, which continuously enlarges in the longitudinal direction L from front to back in the axial direction of the axis of rotation 7.

In this case, the second stop element 22 comprises a second stop region 49, which extends in a second direction 50 that is perpendicular to the first axis of rotation 7 and in the axial direction of the axis of rotation 7.

Figure 4:
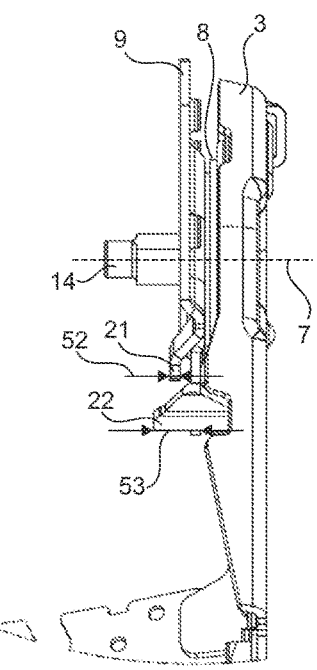
FIG. 4 is a front view of the elements in FIG. 3 in an assembled state.

FIG. 4 is a front view of the elements in FIG. 3 in an assembled state. As can be seen in particular, the axial extension 52 of the first stop element 21, in particular of the first stop region 47, is smaller than the axial extension 53 of the second stop element 22, in particular of the second stop region 49.

If the backrest 2 is rotated about the first axis of rotation 7, the angle between the backrest longitudinal direction RL and the vehicle seat longitudinal direction L constantly changes. As a result, the first 21 and the second 22 stop element are therefore arranged on a common segment when viewed in a direction perpendicular to the first axis of rotation 7. The coil spring 18 is pretensioned to a certain extent here, it also being conceivable, however, for the coil spring 18 not to be pretensioned.

In this case whereby the first 21 and the second 22 stop element correspond to one another, the coil spring 18, in particular the second coil spring end 20, is in operative contact with both the first 21 and the second 22 stop element. If the backrest 2 is now rotated further forwards in the vehicle seat longitudinal direction L, the first stop element 21 and also the second coil spring end 20 are accordingly also rotated. As a result, the second coil spring end 20 remains in contact with the first stop element 21, and the contact between the second coil spring end 20 and the second stop element 22 is simultaneously released.

Since the first coil spring end 20 is arranged so as not to move relative to the adapter element 9 due to the bolt element 14, and the first stop element 21 is also immovably arranged on the adapter element 9, the pretension of the coil spring is not changed, and therefore the backrest 2 can be folded forwards without any force having to be applied.

If, however, the backrest 2 is moved backwards in the vehicle seat longitudinal direction L, the situation changes. The second coil spring end 20 remains in operative contact with the second stop element 22, and the first stop element 21 is moved away from the second coil spring end 20. If the adapter element 9 together with the coil spring 18 is rotated further backwards about the first axis of rotation 7, the pretension of the coil spring 18 is further modified, since the first coil spring end 19 is moved in accordance with the adapter element 9, and the second coil spring end 20 remains in contact with the second stop element 22.

According to one embodiment, the degree to which the coil spring 18 is pretensioned depends on the positions of the first 19 and second 20 coil spring end, in particular of the second coil spring end 20, with respect to the stop elements 21, 22. In this case, the fundamental pretension of the coil spring 18 is specified by the operative contact between the second coil spring end and the second stop element 22, since this pretension is at least always present, as already described above. When the backrest 2 is rotated forwards in the vehicle seat longitudinal direction L, the fundamental pretension is still present, whereas, when the backrest 2 is rotated backwards, the pretension is changed as the backrest 2 is rotated.

However, when assembling the device 1 or the vehicle seat 2, it is not advantageous to have a worker set the pretension of the coil spring, since this is potentially very dangerous for the worker.

During assembly, in order to set the pretension of the coil spring 18, a one-off assembly step is therefore carried out, the individual steps of which are described in more detail in the following.

Figure 5A:
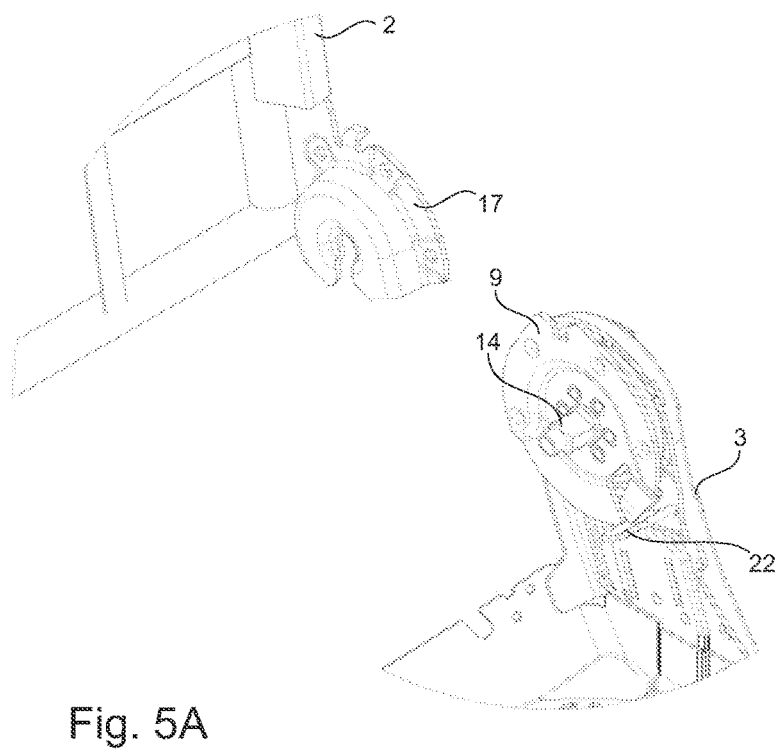

In a first step S1, shown in FIG. 5A, the respective components are correspondingly attached to the backrest 2 and the seat part 3. In this step, the adapter housing 17 is rigidly connected to the backrest 2, and the inclination-adjusting apparatus 8, the adapter element 9 and the bolt element 14 are rigidly connected to the seat part 3. The second stop element 22 is also rigidly connected to the seat part 3.

Figure 5B:
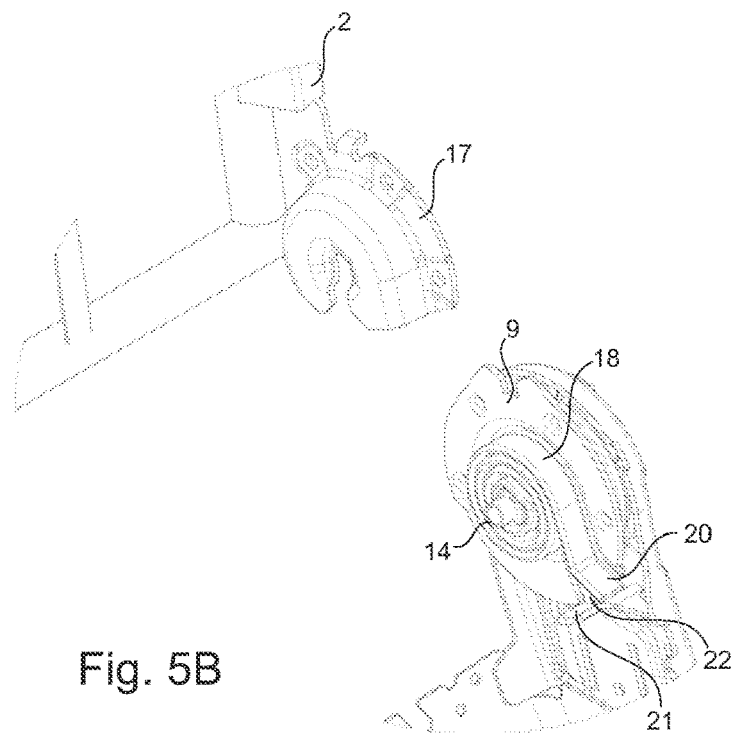

In a second step S2, shown in FIG. 5B, the coil spring 18 is placed on the bolt element 14 in such a way that the first coil spring end 19 is connected to the bolt element 14 in such a way that it does not move but still has a degree of freedom in the axial direction of the first axis of rotation 7. As can be seen, the second coil spring end 20 is still not in operative contact with either the first 21 or the second 22 stop element. In particular, the second coil spring end 20 is arranged in front of the first 21 and the second 22 stop element when viewed in the longitudinal direction L, the second stop element 22 being arranged in front of the first stop element 21.

Figure 5C:
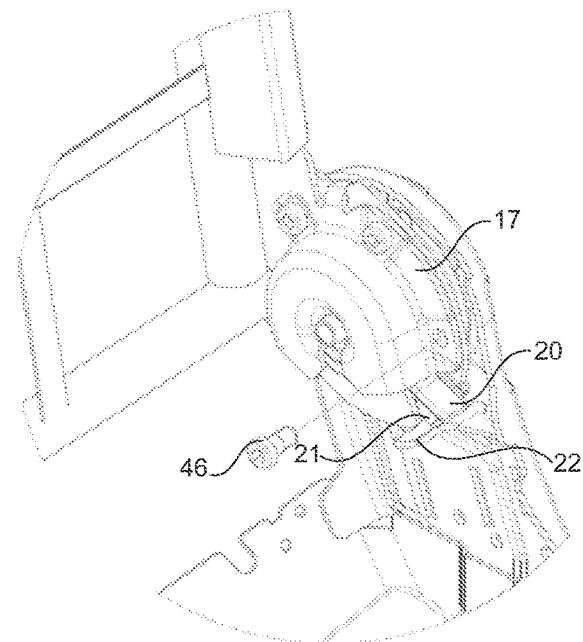
Figure 5H:
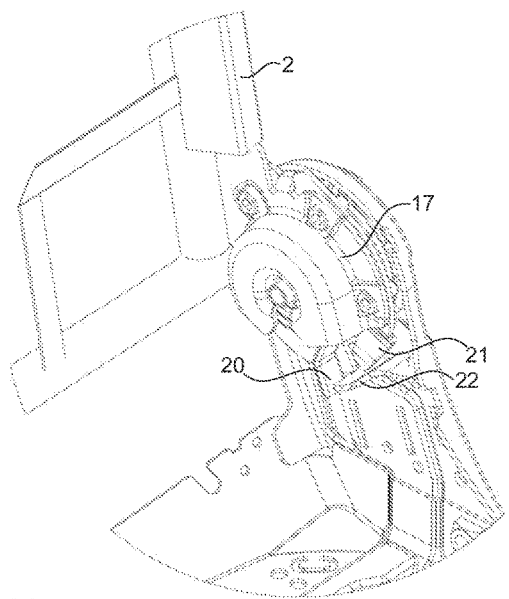

In a third step S3, shown in FIG. 5C, the adapter housing 17 is screwed to the adapter element 9 by screws 46, and the degree of freedom of the coil spring 18 in the axial direction is removed.

FIG. 5D shows a fourth step S4, in which the backrest 2 is rotated forwards in the vehicle seat longitudinal direction L. By designing the second stop element 22 to comprise the enlargement region 54, the second coil spring end 20 is positively guided on the enlargement region 54 until the second coil spring end 20 has jumped over the second stop element 22, in particular the second stop region 49, as shown in FIG. 5E. Therefore, the fundamental pretension of the coil spring 18 has been set. However, the second coil spring end 20 is now located between the first 21 and the second 22 stop element, operative contact only being possible between the second coil spring end 20 and the second stop element 22 until now. In order to allow operative contact with the first stop element 21, the second coil spring end 20 needs to be arranged behind both the first 21 and the second 22 stop element when viewed in the longitudinal direction L.

This is done in a step S5, shown in FIGS. 5F and 5G, in which the backrest 2 is rotated backwards in the longitudinal direction L once again. Since the second coil spring end 20 is arranged between the first 21 and the second 22 stop element in step S4, the first stop element 21 is moved forwards by rotating the backrest 2 backwards. By designing the first stop element 21, in particular the central region 40, which is similar to the enlargement region 54. Since the second stop element 22 extends further in the axial direction than the first stop element 21, the second coil spring end 20 is permanently held by the second stop element. The second coil spring end 20 moves on the central region 40 in a positively guided manner and also jumps over the first stop element 21.

In a final step S6, the backrest is moved into a position in which the backrest longitudinal direction RL and the vehicle seat longitudinal direction L comprise an angle of 90°. The angle between the first direction 48 and the second direction 50 is greater than 0°, preferably 10°, in this case.

Figures 6A, 6B:
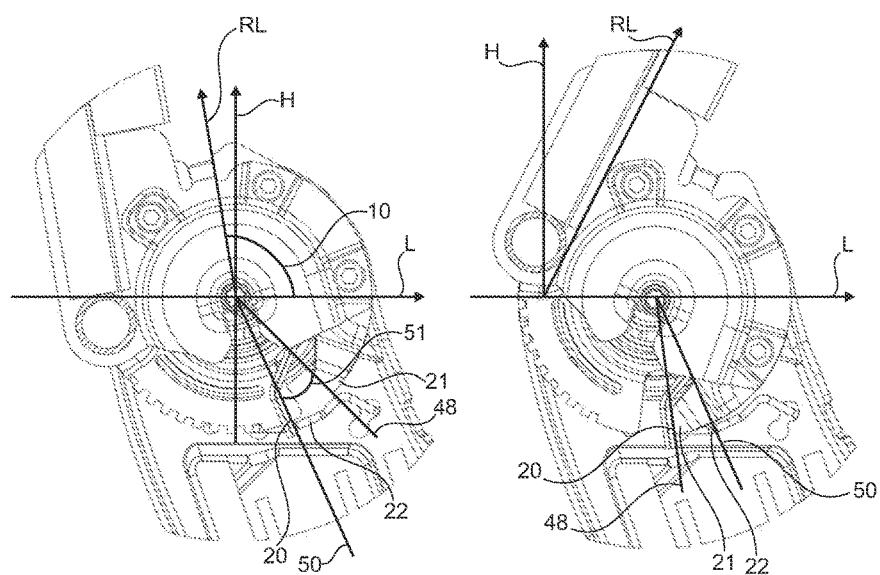
FIGS. 6A and 6B show the device in various positions.

In FIGS. 6A and 6B, the definition of the limit angle is briefly explained by means of the third angle 51 between the first direction 48 and the second direction 50. According to the definition, the limit angle is defined by the "first angle 10 between the backrest longitudinal direction RL and the vehicle seat longitudinal direction L"—the "third angle 51 between the first direction 48 of the first stop element 21 and the second direction 50 of the second stop element 22". The sign of the third angle can change here.

All the features disclosed in the application documents are claimed as being essential to the invention provided that they are novel over the prior art, either individually or in combination.

LIST OF REFERENCE SIGNS 1 device
2 backrest
3 seat part
4 rear region of the seat part
5 lower region of the backrest
6 vehicle seat
7 first axis of rotation
8 inclination-adjusting apparatus
9 adapter element
10 first angle
11 recess
12 first tab
13 second recess
14 bolt element
15 planar region
16 second angle
17 adapter housing
18 coil spring
19 first coil spring end
20 second coil spring end
21 first stop element
22 second stop element
23 first region of the adapter element
24 second region of the adapter element
25 first adapter housing region
26 second adapter housing region
27 first connection point
27' first complementary connection point
28, 28' second connection point
29 adapter plate
30 central region
31 side region
32 tab width
33 central region width
34 tab height
35 central region height
36 funnel
37 short base
38 cylindrical portion
39 initial region
40 central region
41 end region
42 transition region
43 connecting portion
44 second recess width
45 upwardly extending portion
46 screw
47 first stop region 48 first direction
49 second stop region
50 second direction
51 third angle
52 axial extension
53 axial extension
54 enlargement region
L vehicle seat longitudinal direction
B vehicle seat width direction
H vehicle seat vertical direction
RL backrest longitudinal direction

What is claimed is:

1. A device for a vehicle seat for adjusting the inclination of a backrest, which extends in a backrest longitudinal direction, relative to a seat part, an inclination-adjusting apparatus, which can rotate about a first axis of rotation extending in the vehicle seat width direction, of the device for adjusting the backrest inclination being connected to the seat part, characterised in that the device comprises the inclination-adjusting apparatus, an adapter element comprising a generally flat or stamped plate, which can rotate about the first axis of rotation, is rigidly connected to the inclination-adjusting apparatus, is removably connected to an adapter housing that is adapted to be connected to a backrest frame member, and comprises a first stop element that protrudes in a direction of the first axis away from the inclination-adjusting apparatus, wherein the adapter element is formed as a separate piece relative to the inclination-adjusting apparatus and the adapter housing, a coil spring that can rotate about the first axis of rotation and comprises both a first coil spring end, which is arranged so as not to move relative to the adapter element, and a second coil spring end, and a second stop element that is connected to the seat part in such a way that it does not move, the second coil spring end being in operative contact with the first stop element when a first angle between the backrest longitudinal direction and a vehicle seat longitudinal direction is smaller than a limit angle, and being in operative contact with the second stop element when a first angle is greater than the limit angle.

2. The device according to claim 1, wherein the limit angle is selected from a range of from 70° to 90°.

3. The device according to claim 1, wherein the coil spring is pretensioned to a predetermined extent, the pretension being constant when the second coil spring end is in operative contact with the first stop element and being variable as the coil spring rotates when the second coil spring end is in operative contact with the second stop element.

4. The device according to claim 1, wherein the device comprises a bolt element that is mounted so as to be rotatable about the first axis of rotation and is rigidly connected to the adapter element, the first coil spring end being connected to the adapter element by the bolt element.

5. The device according to claim 4, wherein the bolt element comprises at least one planar region which forms a second angle together with the backrest longitudinal direction when viewed in the vehicle seat width direction.

6. The device according to claim 1, wherein the inclination-adjusting apparatus, the adapter element and the coil spring are arranged one behind the other when viewed in the vehicle seat width direction from the seat part to the backrest.

7. The device according to claim 1, wherein the first stop element comprises an initial region, a central region and an end region, the end region lying in a first plane that is perpendicular to the first axis of rotation.

8. The device according to claim 7, wherein the end region comprises a stop region which extends on the one hand in a direction that is perpendicular to the first axis of rotation and on the other hand in the axial direction of the axis of rotation.

9. The device according to claim 1, wherein the second stop element comprises an end region which extends on the one hand in a direction that is perpendicular to the first axis of rotation and on the other hand in the axial direction of the axis of rotation.

10. The device according to claim 1, wherein the second coil spring end extends in a direction that is perpendicular to the first axis of rotation and in the axial direction of the axis of rotation.

11. A method for assembling a device according to claim 1, wherein the second coil spring end not being in operative contact with the first or the second stop element, and the second coil spring end being arranged in front of the first and the second stop element when viewed in the vehicle seat longitudinal direction, and the second stop element being arranged in front of the first stop element; said method comprising:

rotating the backrest forwards in the vehicle seat longitudinal direction, the second coil spring end being positively guided along the second stop element until the second coil spring end jumps over the second stop element, as a result of which the fundamental pretension of the coil spring is set; and rotating the backrest backwards in the vehicle seat longitudinal direction, the first stop element being moved forwards as a result of the backwards rotation of the backrest, and the second coil spring end moving on the second stop element in a positively guided manner and jumping over the first stop element.

* * * * *